May 9, 1961

R. BUSER ET AL

APPARATUS FOR SIGNALING INDIVIDUAL IMPULSES OF SHORT DURATION

Filed Jan. 25, 1956

2,983,905

Inventors.
Rudolf Buser, &
Hans Kaufmann.
By [signature] Atty.

United States Patent Office 2,983,905

Patented May 9, 1961

2,983,905

APPARATUS FOR SIGNALING INDIVIDUAL IMPULSES OF SHORT DURATION

Rudolf Buser and Hans Kaufmann, Munich, Germany, assignors to Siemens & Halske Aktiengesellschaft, Munich, Germany, a corporation of Germany Filed Jan. 25, 1956, Ser. No. 561,301

Claims priority, application Germany May 25, 1955

7 Claims. (Cl. 340—174)

This invention is concerned with a method of and apparatus for signaling individual impulses of short duration.

One of the important problems in the operation of signaling apparatus, especially of apparatus for processing messages appearing in the form of impulses, is to recognize, indicate or signal the messages. This problem is for example present in digital calculators at the output of a calculating machine at which the calculated result is to be reproduced by means of a printer, for example, the printer of a teleprinter machine.

The invention proposes to solve the indicated problem very accurately, and with simple means, by conducting to a dynamic register the impulse that is to be indicated, and by utilizing for the indication integrated impulses occurring in the register during the time in which the impulse to be indicated is being stored. Therefore, in accordance with the invention, an individual impulse of a duration too short to release any mechanical operation, for example, the operation of a relay, is conducted to a dynamic 1-bit-register and the output impulses of such register are used for indication.

Dynamic registers of various designs are known, comprising in the main a timing member which may be in a closed loop by way of an amplifier. The impulse may then either circulate in such loop with a frequency which is a function of the physical properties of the arrangement (for example an Hg-tank) or the impulse is shifted, by means of timing members comprising individual storage elements, by a special timing impulse, always by one storage element and circulates thus in the loop with a frequency determined by the timing. An impulse once stored accordingly circulates in a dynamic register continuously; the advantage of such a register as compared with a static register is that impulses can be continuously taken off so long as there is an information present, that is, so long as there is an impulse stored.

The invention provides this advantage by utilizing for the indication the impulses to be taken off, for example, by integrating the impulses, conducting them, for example, to a capacitor and employing the charging or discharge current thereof for the indication.

Figure 1:
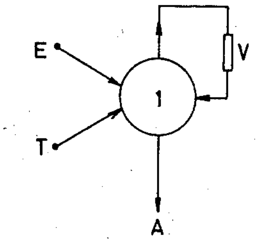
Figure 2:
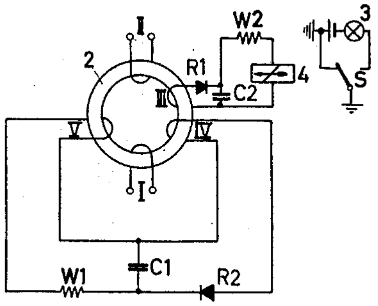
Figure 3:
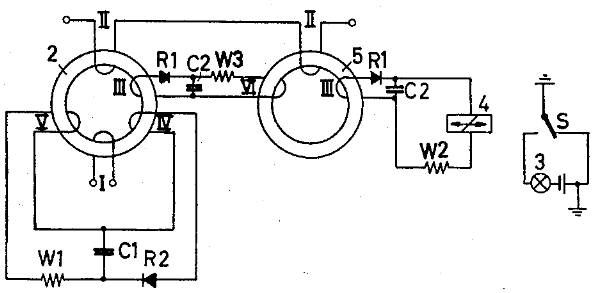

The above indicated and other objects and features of the invention will appear from the description of embodiments rendered below with reference to the accompanying drawing in which Fig. 1 is a diagrammatic representation of the principle involved;

Fig.2 shows a circuit diagram in accordance with the principle embodied in Fig. 1; and Fig. 3 shows a modification.

In Fig. 1, numeral 1 indicates a dynamic register which comprises mainly a magnetic core with square hysteresis loop such as will be presently described in connection with Figs. 2 and 3. It is however also possible to employ another dynamic register, for example, a register using one or more tubes.

To the dynamic register is conducted a timing pulse over the input T. It shall be assumed first that the register is in 0-condition. Practically no voltage is in such case produced by the timing pulses at the output A.

Now, if a single impulse is supplied by way of the input E, the core will be tipped into the 1-condition and brought again to the 0-condition at the occurrence of the next timing impulse. A relatively high voltage is induced at the output A as well as at the output which feeds a delay element V incident to the tipping of the core from the 1-condition to the 0-condition, such voltage being so high that it tips the register after running through the delay element V again into the 1-condition. The cycle is repeated upon occurrence of the next timing impulse and so long as the information is dynamically stored there will appear at the output A a succession of impulses which can be used for indication. Only when the information is cancelled by way of input E will the output A be without voltage in spite of the occurrence of timing pulses.

Fig. 2 shows circuit means for realizing the operation indicated in diagram Fig. 1. As a dynamc register there is provided a magnetic core 2 which has as previously mentioned a square hysteresis loop. Upon this magnetic core are disposed five windings I to V. The individual impulse which is to be stored or indicated is supplied to the winding I, such winding accordingly corresponding to the input E of Fig. 1. To the winding II is connected the timing pulse and such winding accordingly corresponds to the input T of Fig. 1. The winding III corresponds to the output A in Fig. 1. The individual impulse delivered to the magnetic core 2 is to be signalled by the lamp 3. The impulse sequence appearing at a winding III is for this purpose integrated by means of the capacitor C2 due to the time constant of the RC member W2—C2. The resistor W2, upon appearance of an impulse sequence at the winding III, causes charging of the capacitor C2, thus preventing immediate discharge over the winding of relay 4. The discharge current resulting from a single impulse would be insufficient for energizing the relay or another signal device operating with inertia. However, operative actuation of relay 4 can be effected by increasing the potential on the capacitor and therewith the current in the circuit of relay 4 to a sufficient value, which is done by storing the impulse sequence given off by the dynamic register. Upon operating, the relay 4 places its contact S into alternate position to close a circuit for the lamp 3 so as to signal the occurrence of the impulse.

The delay member in the feedback loop between windings IV and V comprises a capacitor C1 and a resistor W1.

The operation of the arrangement is in accordance with the explanations given in connection with Fig. 1. The essential steps will however be explained again. They are as follows:

So long as the core is in 0-condition, only a very low voltage will be induced in the windings III and IV when a timing pulse is supplied to the winding II. This induced voltage is insufficient to "tip" the core with respect to winding V and likewise insufficient for producing a current in the circuit of relay 4 that would permit the relay to operate. If the core is now brought into the 1-condition over the winding I, a high voltage will be induced in the windings III and IV incident to the next timing pulse, the core again tipping it to the 0-condition. A high voltage is thus fed to the capacitor C1 and the discharge current of the capacitor, affecting the winding V, causes the core after a predetermined interval, depending upon the magnitude of the resistance of the resistor W1, to tip into the 1-conditon, that is, the information has been dynamically stored. A relatively strong current is at the same time induced in the circuit of relay 4. The current induced in the relay circuit averaged over a series of timing pulses causes relay 4 to energize. It is suitable to provide a capacitor C2 in the relay circuit; however, in some special cases, the capacitance of the winding of relay 4 may be utilized for the integration of the individual impulses to be taken off from the winding III.

The circuit also includes two rectifiers R1 and R2. The purpose of these rectifiers is to prevent current flow of the charges stored in the capacitors C1 and C2 respectively back into the take-off windings III and IV, thus preventing loss of current for the indication and magnetization of the core.

As shown in Fig. 3, it may in some circumstances be of advantage to avoid connecting the relay circuit directly to the dynamic register so as to prevent reactions and consequently heavy loading of the register. In the illustrated example, there is provided a magnetic core 5, also having a square hysteresis loop, which uncouples the relay circuit from the circuit of the dynamic register. The circuit of the magnetic core 2 is practically identical with the circuit of the corresponding magnetic core shown in Fig. 2, except that the winding III is connected with the input winding VI of the magnetic core 5 instead of with the relay. The resistor W3 has the same purpose as the resistor W2 in Fig. 2. The resistor W3 delays the arrival of the impulse, induced in winding III, at the input winding VI of the magnetic core 5, thus preventing overlapping of the effect of such impulse with the effect of the timing impulse at the winding II of the magnetic core 5. The circuit of the winding III of the core 5 is identical with the corresponding circuit of Fig. 2.

The invention is not inherently limited to the described embodiments but may be realized with other and most diverse dynamic registers. It may be advantageous in some circumstances to dispose one or more timing elements between the indicating means or register and the dynamic register in which the impulse to be signaled or indicated is to be stored. These timing elements may again be designed in the form of magnetic cores with square hysteresis loop, especially in the form of 1-bit-registers. The indication of the impulse to be signaled will then be shifted by $n$-steps when $(n-1)$ 1-bit-registers are provided as indicated.

Changes may be made within the scope and spirit of the appended claims which define what is believed to be new and desired to have protected by Letters Patent.

We claim:

1. Apparatus for signaling single impulses of short duration comprising an impulse-responsive device which requires for its operative actuation an energizing interval exceeding the duration of a single impulse, a dynamic one-bit register, means for feeding to said register at single impulse to be signaled so as to store said impulse therein, means for taking off impulses, resulting from said single fed impulse, from said register during the storing time of said impulse and for integrating the resulting impulses so taken off, means for feeding said integrated impulses to said impulse-responsive device to cause actuation thereof, and means for signaling the actuation of said impulse-responsive device as a signal for the occurrence of said stored impulse.

2. Apparatus according to claim 1, comprising a capacitance for integrating said impulses.

3. Apparatus according to claim 1, wherein the capacitance of said impulse-responsive device is utilized for the integration of said impulses.

4. Apparatus according to claim 1, comprising a relay constituting said indicating means, the capacitance of the winding of said relay being utilized for the integration of said impulses.

5. Apparatus according to claim 1, wherein said dynamic register comprises a magnetic core with square hysteresis loop, an auxiliary winding for said core, a capacitor connected in parallel with said winding, a rectifier in said capacitor-winding circuit, said capacitor being charged by said impulses taken off and discharging over said impulse-responsive device.

6. Apparatus according to claim 5, comprising means for uncoupling said dynamic register and said impulse-responsive device.

7. Apparatus according to claim 6, comprising a magnetic core with square hysteresis loop for uncoupling said dynamic register and said impulse-responsive device, means for conducting to said core a timing pulse and the pulses taken off from said dynamic register, and means for taking off from said core impulses for the actuation of said impulse-responsive device.

References Cited in the file of this patent

UNITED STATES PATENTS

| | | |
|---|---|---|
| 2,673,337 | Avery | Mar. 23, 1954 |
| 2,778,006 | Guterman | Jan. 15, 1957 |
| 2,935,735 | Kodis et al. | May 3, 1960 |

FOREIGN PATENTS

| | | |
|---|---|---|
| 157,186 | Australia | June 23, 1954 |

OTHER REFERENCES

"A Magnetic Scaling Circuit," by Hellmuth Hertz, published January 1951, "Journal App. Physics," pp. 107–108.